United States Patent [19]

Houseman et al.

[11] 4,262,958

[45] Apr. 21, 1981

[54] ADJUSTABLE SEAT FOR AN INDUSTRIAL VEHICLE

[75] Inventors: Henry J. Houseman, Fairless Hills; John S. McPherson, Philadelphia, both of Pa.

[73] Assignee: Eaton Corporation, Cleveland, Ohio

[21] Appl. No.: 73,470

[22] Filed: Sep. 7, 1979

[51] Int. Cl.³ .............................................. B60N 1/02
[52] U.S. Cl. .............................. 296/65 R; 180/89.14; 248/425; 297/349
[58] Field of Search ................... 296/65 R; 180/89.13, 180/89.14; 297/346, 349; 248/425, 429

[56] References Cited

U.S. PATENT DOCUMENTS

| 3,463,542 | 8/1969 | Daniels | 296/65 R |
| 3,708,203 | 1/1973 | Barecki | 297/349 |
| 3,787,086 | 1/1974 | Cosby | 296/65 R |

Primary Examiner—John J. Love
Assistant Examiner—John A. Carroll
Attorney, Agent, or Firm—R. J. McCloskey; F. M. Sajovec, Jr.

[57] ABSTRACT

A support assembly for the seat (32) of an electric lift truck (10) which permits the seat to be pivoted about a vertical support member (24) and slid outward to move the seat clear of the truck's battery compartment (12). The means for pivoting the seat includes a first latch (44) which normally keeps the seat from rotating relative to the support member (24). The seat is mounted on a sliding mounting assembly (30) which allows the seat to be slid outward of the truck, and which also includes a latch assembly (68) for normally maintaining the seat in an operating position.

8 Claims, 6 Drawing Figures

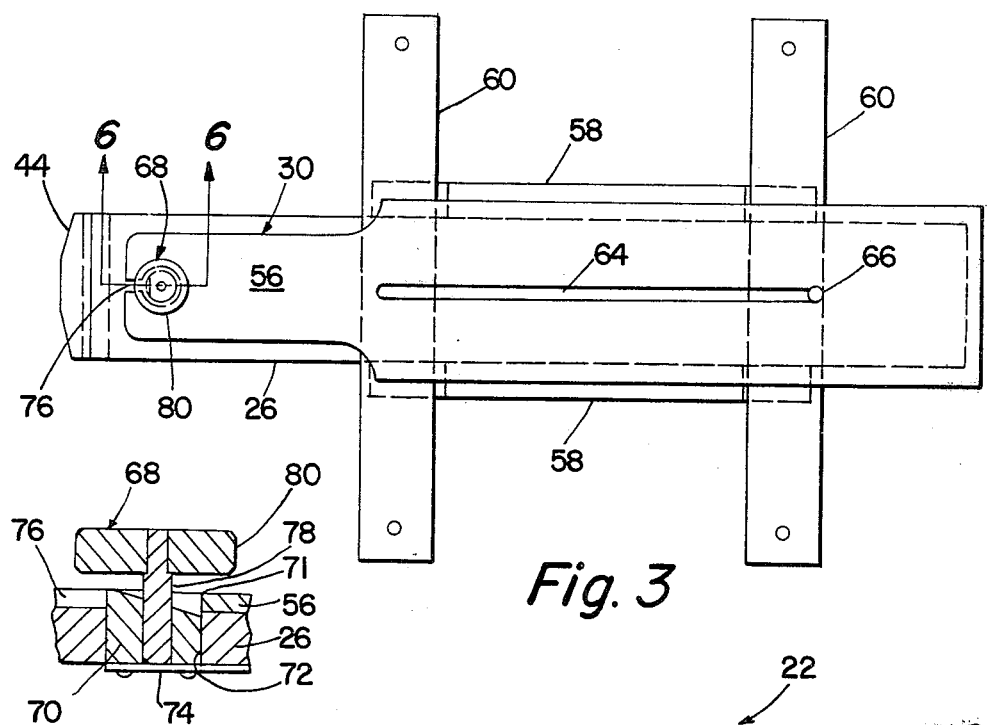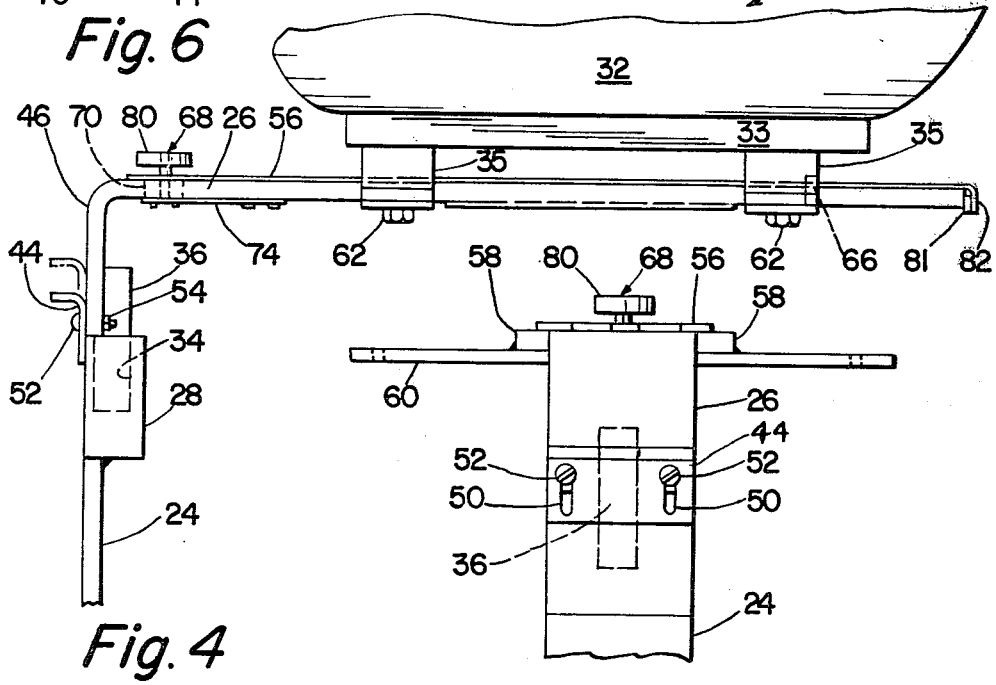

ADJUSTABLE SEAT FOR AN INDUSTRIAL VEHICLE

This invention relates to seats for industrial vehicles, and more particularly to an adjustable seat particularly adapted for use in an electric lift truck.

In an electric lift truck, an operator's station is normally provided adjacent the forward end of the truck, and a battery is located adjacent the rear end of the truck. The operator's seat is generally located above at least a portion of the compartment which houses the battery; therefore, when the battery is to be removed, it is necessary for the seat to be moved to a non-interfering location, either by removing the seat, or by means which permit the seat to be moved temporarily by pivoting or otherwise.

In some lift truck designs, it is sufficient to pivot the seat forward to provide access to the battery. On others, the seat can be pivoted to the side or about multiple axes.

Another factor which must be considered in the design of such adjustable seats is the nature of the equipment which is used to remove the battery. In order to accommodate certain types of overhead battery removal equipment, it is necessary to move the seat to a position outside the boundary defined by the vehicle, a position which is difficult to attain by simple pivot means.

It is thus an object of the present invention to provide a seat for a lift truck which can be moved to a position outside the boundary of the vehicle while leaving the seat attached to the vehicle.

Another object of the invention is to provide a seat as above which incorporates adjustment means which is simple, reliable, and inexpensive.

To meet the above objectives, the present invention provides a mounting assembly for a vehicle seat which allows the seat to be pivoted to a side of the vehicle and then slid outward away from the vehicle. A first latch is provided at the pivot point, which is both simple to operate and yet positively locks the seat in position for operation of the vehicle. A second latch normally maintains the seat in an operating position and permits outward sliding of the seat when a release mechanism is actuated.

Other objects and advantages will become apparent from the following description, when taken in connection with the accompanying drawings, wherein:

FIG. 3 is an enlarged plan view of the invention with the seat removed;

FIG. 4 is an enlarged side elevation view of the invention;

FIG. 5 is an enlarged front elevation view of the invention with the seat removed; and FIG. 6 is an enlarged fragmentary section view taken along line 6—6 of FIG. 3.

Figure 1:
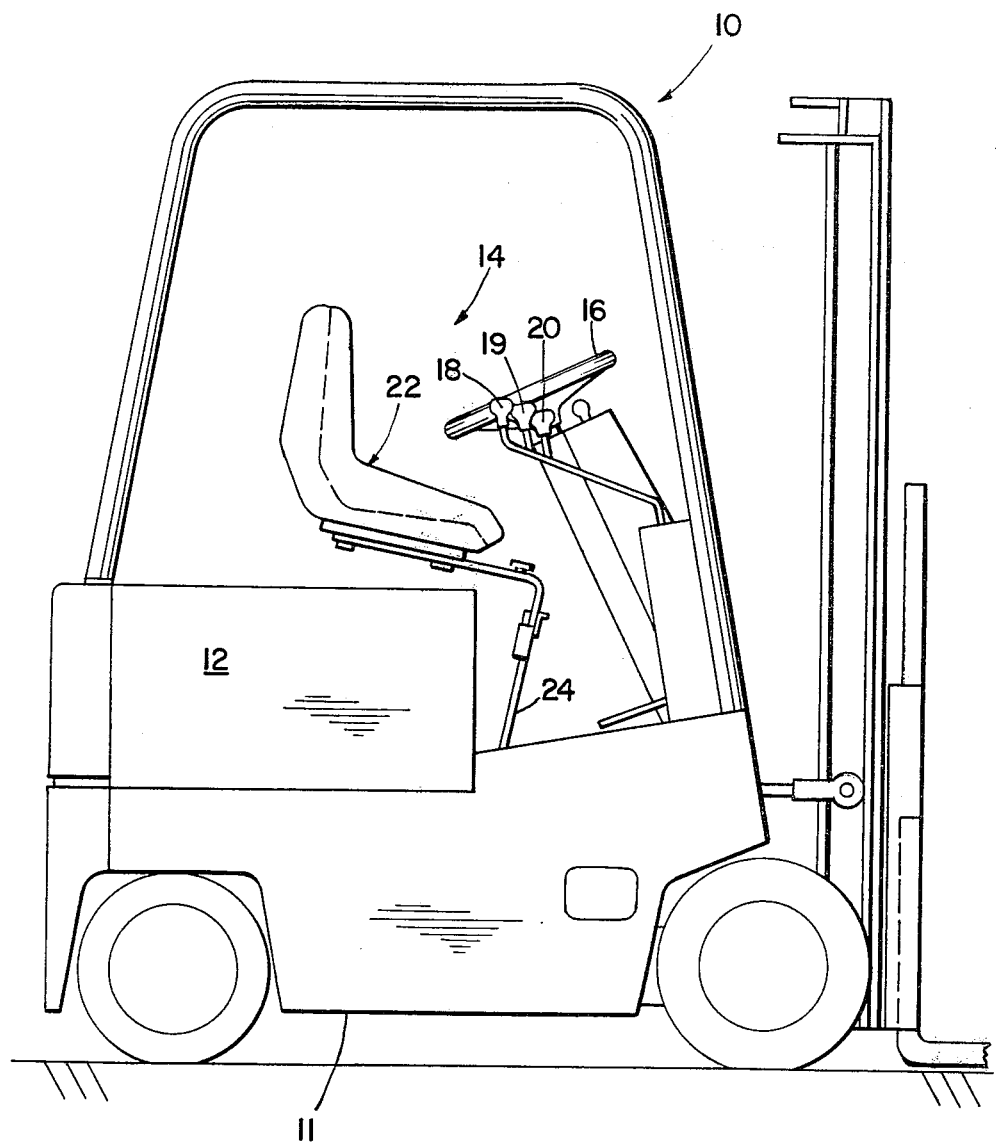
FIG. 1 is a side elevation view of an industrial truck incorporating the invention.

Referring to the drawings, there is illustrated an electric lift truck 10, including a frame 11, a battery compartment 12, and an operator's station 14.

The operator's station comprises the well-known controls normally associated with a lift truck, including a steering wheel 16, lift control 18, tilt control 19, auxiliary control 20; and a seat assembly 22.

The seat assembly 22 is mounted on a primary support member 24, which is pivotally mounted internally of the frame 11 and which is spring biased to tilt to the right when unoccupied as viewed in FIG. 1, to define a dead man control. Such controls are well-known in the art, comprising switch or linkage means operatively connected to the support member 24 to render the truck inoperative when the operator leaves the seat, and will not be described in further detail herein.

Referring particularly to FIGS. 3, 4 and 5, the seat assembly 22 comprises a substantially L-shaped seat support member 26 which is pivotally received in a support block 28 welded or otherwise fastened to the free end of the primary support member 24, a seat mounting assembly 30 slidingly received on the support member 26, and a seat 32 bolted or otherwise fastened to the support assembly 30.

To mount the seat support member 26 to the primary support member 24, a hole 34 is formed in the upper surface of support block 28 to receive a pin 36 which is welded to the short leg of the support member 26.

To retain the seat support member 26 in an aligned position relative to the primary support member 24, a latch plate 44 is slidably attached to the front face 46 of the seat support member 26. The latch plate 44 is L-shaped in profile, with the short leg defining a handle. Slots 50 are formed in the long leg, and shouldered screws 52 are loosely received through the slots and threaded into the support member 26, where they are locked by means of nuts 54.

Figure 2:
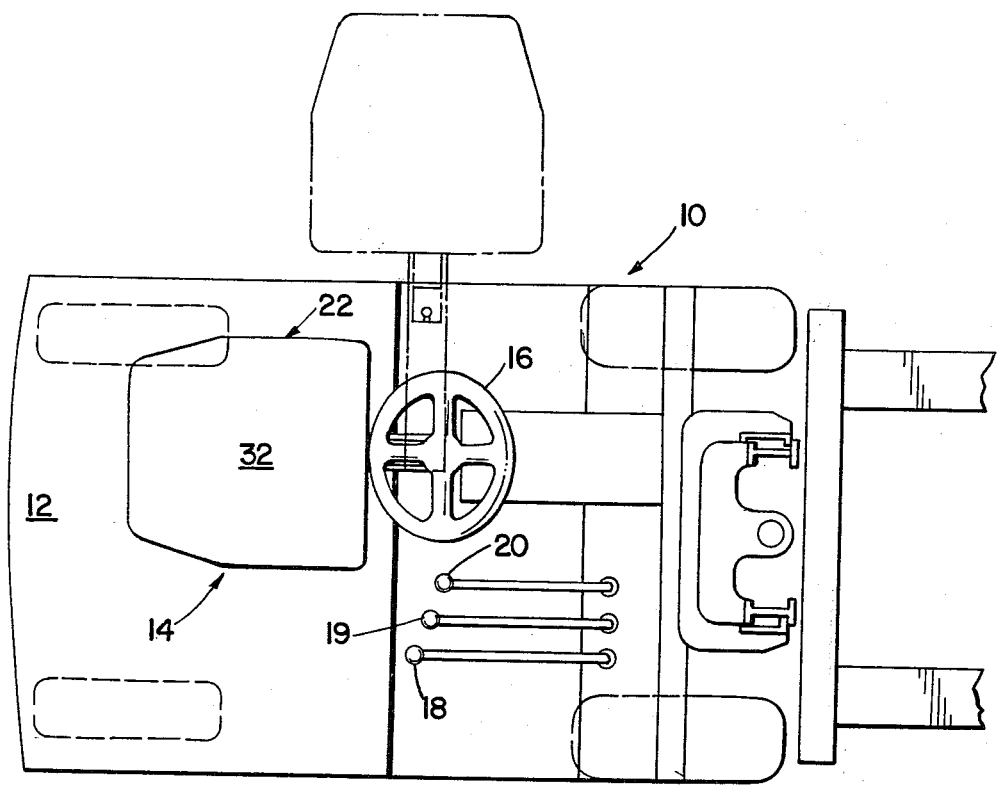
FIG. 2 is a plan view of the truck of FIG. 1 with the overhead guard removed for clarity.

When the pin 36 is received in hole 34, with the lower end of the support member 26 resting against the upper surface of the support block 28, and the latch plate 44 is in its lowermost position as shown in full line in FIG. 4, the latch plate acting against support block 28 prevents the seat support member 26 from pivoting relative to primary support member 24, thus retaining the seat assembly in its normal angular position as shown in FIG. 1 and in full line position of FIG. 2. When it is desired to swing the seat assembly 22 clear of the battery compartment 12, the latch plate 44 is lifted, as shown by the broken line position of FIG. 4, until its lower edge is aligned with the lower edge of the seat support member 26, allowing the support member 26 to be pivoted relative to the primary support member 24 on pin 36.

To move the seat 32 completely clear of the truck, the seat mounting assembly 30 is adapted to slide outward relative to the seat support member 26. The seat mounting assembly 30 comprises a relatively thin plate 56 to which a pair of elongated runners 58 are welded, and a pair of seat support crossmembers 60 which are welded to the undersides of the runners 58 at opposite ends thereof and oriented perpindicularly thereto. The seat 32 includes a lower frame member 33 having feet 35 attached thereto which are bolted to the crossmembers 60 by means of bolts 62.

The seat mounting assembly 30 is received on the long leg of the support member 26 by sliding it over the leg, with the plate 56 received on top of the support member 26 and the crossmembers 60 beneath the leg. The runners 58 are spaced apart on the plate 56 to provide a sliding fit against the side edges of the support member 26. An elongated slot 64 is formed through the plate 56 along its longitudinal centerline. Sliding movement of the seat mounting assembly 30 relative to the support member 26 is limited by means of a pin 66 which is press fit into the support member 26 at assembly and extends upward into the slot 64.

In FIGS. 3 and 4 the seat mounting assembly is illustrated in its normal, or forward position relative to support member 26, with the pin 66 in contact with the right end (as viewed in FIGS. 3 and 4) of the slot 64. To move the seat 32 clear of the truck 10, the seat mounting assembly 30 can be slid to the right relative to the support member 26 until the pin 66 contacts the left end of slot 64, as illustrated by the broken line position of FIG. 2.

To maintain the seat in its forward position for normal truck operation, a latch assembly 68 is provided, acting between the seat support member 26 and the seat mounting assembly 30. Referring particularly to FIGS. 3, 4 and 6, the latch assembly comprises a cylindrical latch member 70 which is received in a hole 72 formed in the seat support member 26 and retained therein by a flat spring 74 which is riveted or otherwise fastened to the underside of the latch member and to the underside of the seat support member 26 by screws or the like. The top surface 71 of latch member 70 is angled downward from front to back (left to right as shown in FIG. 6) and the height at the front is slightly greater than the thickness of the support member 26, so that the front edge of the latch member engages a keyhole slot 76 formed in the plate 56. To facilitate disengagement of the latch assembly, a pin 78 is press fit into an axial hole formed in the latch member 70, and a cylindrical knob 80 is press fit onto the pin. In its normal position, as shown in FIG. 4, the spring 74 maintains the latch member in a position wherein the top front edge of the latch member engages the plate 56. When it is desired to move the seat 32 outward on the support member 26, the knob 80 is pushed downward against the pressure of spring 74 until the latch member 70 clears the plate 56. The plate 56, to which the seat 32 is attached through runners 58 and crossmembers 60, is then slid to the right as viewed in FIG. 4 until the pin 66 contacts the front edge of slot 64. When it is desired to return the seat to its normal position, the plate 56 is slid to the left as viewed in FIG. 4. Because of the angle of the top surface 71 of latch member 70, the plate 56 will force the latch member downward against the force of spring 74, until the latch member registers with the circular portion of keyhole slot 76, and re-engages the plate. A resilient bumper 81 is adhered to a downturned portion 82 of the plate 56, and engages the rear edge of the seat support member 26 when the pin 66 engages the right end of slot 64. The bumper cushions the engagement of the pin with the end of the slot, and the resiliency of the bumper causes the plate 56 to be biased slightly to the right, thus insuring that the latch member 20 will be maintained in a locked position against the edge of keyhole slot 76.

When the truck 10 is ready for operation, the seat assembly 22 will be in the position shown in FIG. 1, with the seat support member 26 in its latched position with respect to primary support member 24, and the seat 32 in its latched position with respect to the seat support member 26.

When it is desired to gain access to the battery compartment 12 for removal or servicing of the truck's batteries, the latch plate 44 is raised to the broken line position of FIG. 4 to allow the seat support member 26 to be rotated. The latch assembly 68 is then actuated by pushing down on knob 80, and the plate 56 is slid outward, thus putting the seat in the broken line position of FIG. 2.

We claim:

1. In an electric lift truck including a frame, an operator's station, a battery compartment disposed adjacent the operator's station, an operator's seat disposed above the battery compartment, a first seat support member attached to said frame, a second seat support member mounted on said first seat support member for rotation relative thereto about a substantially vertical axis, first latch means attached to said second seat support member to normally maintain said second seat support member in a first position relative to said first seat support member, means mounting said seat on said second seat support member for sliding movement in a substantially horizontal plane, and second latch means mounted on said second seat support member for normally maintaining said seat in a first position relative to said second seat support member; the improvement in which said first seat support member comprises a first substantially flat plate member having a boss formed at its upper edge; said second seat support member comprises a second substantially flat plate member having a pin attached to and extending from its lower edge, said pin being received within a socket formed in said boss; said first latch means comprising a latch plate member slidably attached to said second seat support member adjacent said lower edge and movable between a first position wherein said latch plate member overlaps said first and second plate members and a second position wherein said latch plate member is clear of said first plate member to permit said second seat support member to rotate relative to said first seat support member about said pin.

2. Apparatus as claimed in claim 1 in which said second seat support member is substantially L-shaped including a vertical leg mounted on said first seat support member and a horizontal leg; said means mounting said seat on said second seat support member comprising a seat mounting assembly slidable along said horizontal leg, said second latch means comprising a cylindrical latch member attached to said horizontal leg and moveable between a first position engageable with said horizontal leg and with said seat mounting assembly and a second position disengaged from said seat mounting assembly.

3. Apparatus as claimed in claim 2, in which said seat mounting assembly comprises a flat plate received on the upper surface of said horizontal leg, a pair of runners attached to the underside of said flat plate and in sliding engagement with the side edges of said horizontal legs, and a pair of spaced apart crossmembers attached to said runners and in sliding engagement with the underside of said horizontal leg, said seat being attached to said crossmembers.

4. Apparatus as claimed in claim 3, in which an elongated slot is formed in said flat plate parallel to the longitudinal axis thereof, and a pin is received in the upper surface said horizontal leg and extends upwards therefrom, said pin being engageable with the ends of said slot to limit relative sliding movement between said seat mounting assembly and said horizontal leg.

5. Apparatus as claimed in claim 3, in which said second latch means comprises a cylindrical latch member received in a hole formed through said horizontal leg, said latch member having an angled upper portion a forward edge of which protrudes above said horizontal leg when said latch member is in a first position;

means biasing said latch member to said first position, and a keyhole slot formed in said flat plate with a rounded portion of said keyhole slot alignable with said latch member, an edge of said keyhole slot being engageable with an edge of said latch member when said latch member is in said first position.

6. Apparatus as claimed in claim 5, wherein said means biasing said latch member comprises a flat spring attached to said latch member and to said horizontal leg, deflection of said latch member against the force of said spring moving said latch member out of engagement with the edge of said keyhole slot.

7. Apparatus as claimed in claim 6, in which the protuding portion of said latch member is formed at an angle such that movement of said flat plate in one direction will cause said plate to engage said angled surface to move said latch member to a position out of engagement with said flat plate; movement of said plate in the opposite direction causing said plate to engage a side of said cylindrical latch member.

8. Apparatus as claimed in claim 7, including resilient bumper means acting between said flat plate and said horizontal leg, said bumper means biasing said flat plate against said cylindrical latch member when said flat plate is in engagement with a side of said cylindrical latch member.

* * * * *